Oct. 15, 1935.  E. J. THURBER  2,017,776
GEAR SHIFTING DEVICE
Filed Sept. 4, 1934  3 Sheets-Sheet 1

Inventor
Edward J. Thurber
By Norris & Bateman
Attorney

Patented Oct. 15, 1935

2,017,776

UNITED STATES PATENT OFFICE 2,017,776

GEAR SHIFTING DEVICE

Edward John Thurber, New Orleans, La., assignor of one-half to Ralph K. Rothrock, New Orleans, La.

Application September 4, 1934, Serial No. 742,649

18 Claims. (Cl. 74—364)

The present invention relates to improvements in gear changing devices for automobile transmission mechanisms, and it relates more particularly to means for shifting the gear changing elements thereof for making different desired gear changes automatically or without requiring the driver to manipulate manually a hand shifting lever as heretofore required.

One of the primary objects of the invention is to provide a simple and improved gear changing device which is capable of automatically selecting the different gear changes, either progressively from first speed up to third or high speed, or retrogressively from third or high speed down to second or first speed.

Another object is to provide means for visually indicating to the driver at all times the gear or speed for which the device is set.

Another object is to provide a device of this character having relatively simple fluid operated means for actuating the shiftable gear changing bars or elements of the transmission mechanism and electro-magnetic means for controlling the operation of such fluid pressure operated actuating means.

A further object of the invention is to provide a gear changing device which can be applied to an automobile transmission mechanism of conventional form, either exteriorly or interiorly of the transmission mechanism, without requiring alteration or modification of such mechanism.

To these and other ends, the invention consists in certain improvements and combinations and arrangements of parts all as will be hereinafter more fully described, the features of novelty being pointed out particularly in the claims at the end of this specification.

In the accompanying drawings:—

Similar parts are designated by the same reference characters in the different figures.

Gear changing devices embodying the present invention are applicable generally to automobile transmission mechanisms of the conventional form employing a pair of reciprocatory shifting bars connected respectively to the sliding gears or gear changing elements of the mechanism, each of these bars being slidable from a normal or neutral position in either direction to effect one or another gear change. The preferred embodiments of the invention are shown in the accompanying drawings and will be hereinafter described in detail, but it is to be understood that the invention is not restricted to the precise constructions and arrangements shown since equivalent constructions and arrangements are contemplated and such will be included within the scope of the claims.

Figures 1, 2, 16, 17:
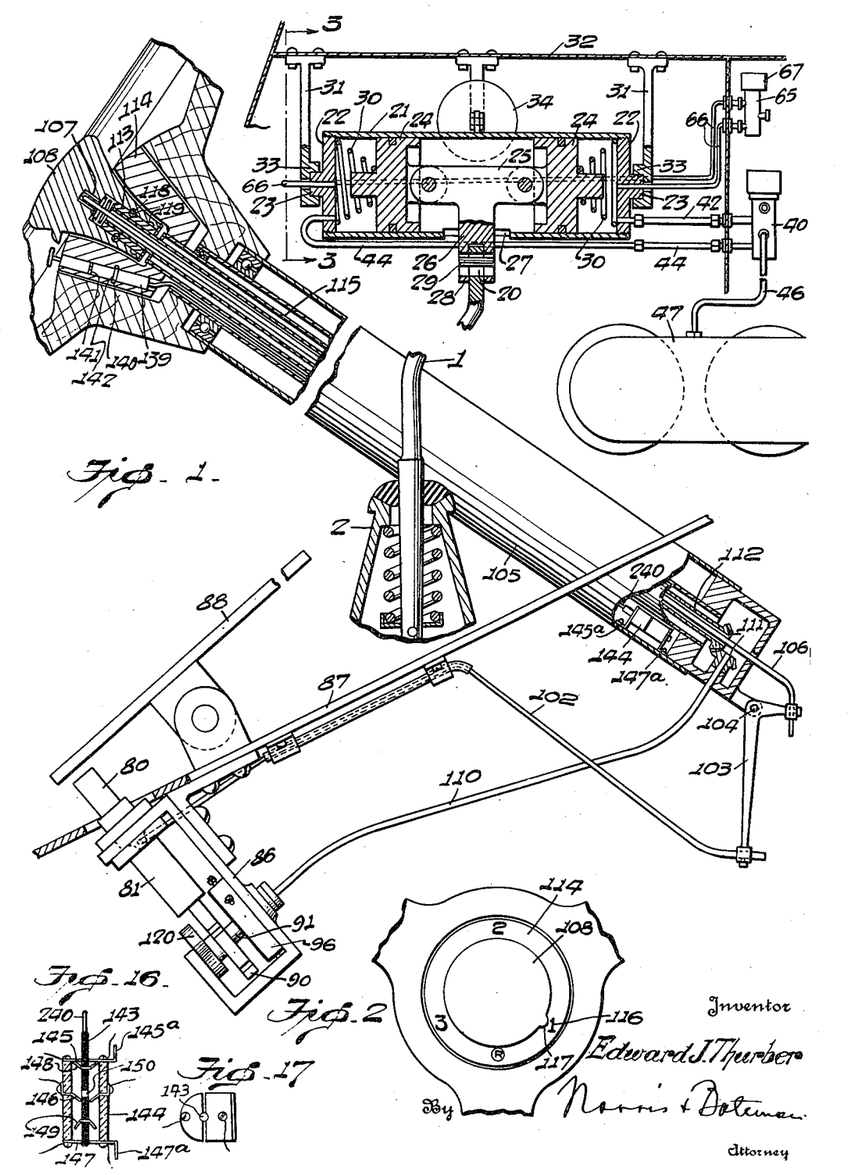
Figure 1 is a view in elevation, partly in section, of a gear changing device embodying the present invention applied to the usual hand shifting lever of an automobile transmission mechanism.
Figure 2 is a detail view of the indicator on the top of the steering column which indicates the speed for which the shifting device is set.
Figure 16 is a detail sectional view of the reversing switch.
Figure 17 is a top plan view of the switch shown in Fig. 16.
Figures 3, 4, 5, 9, 10, 11, 12, 13, 14:
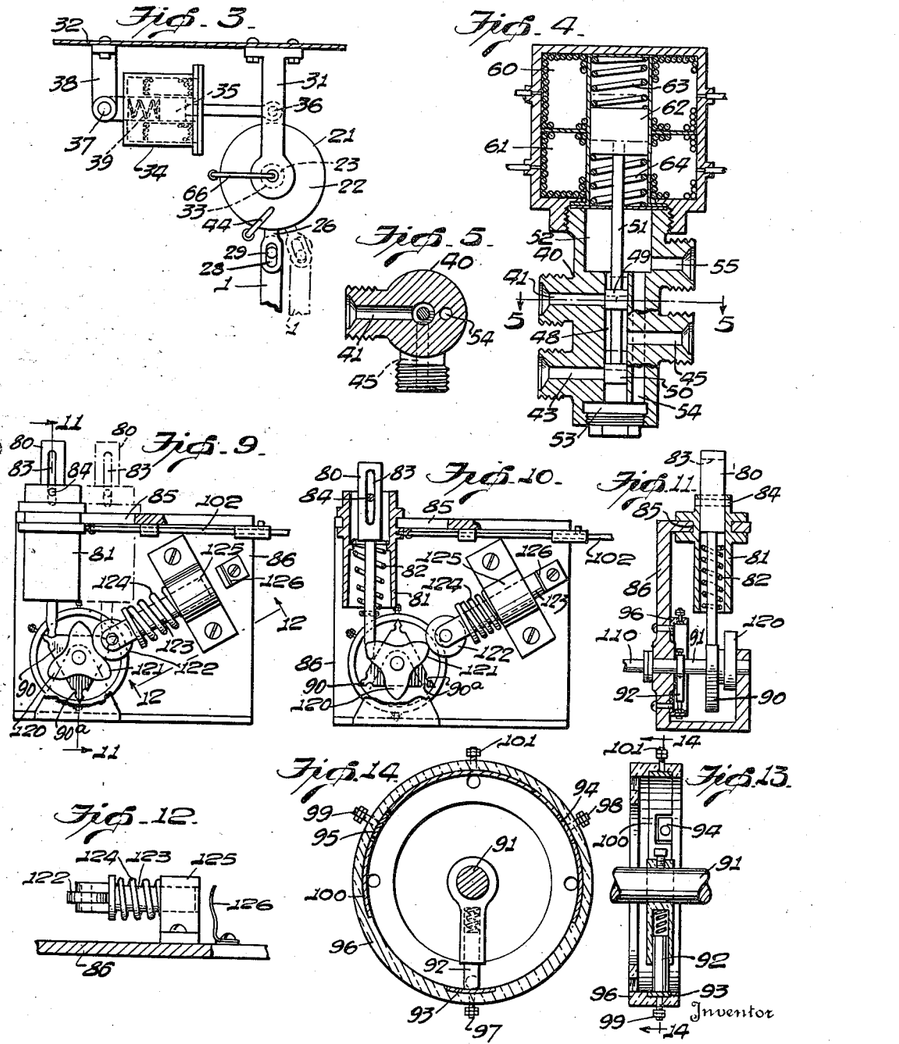
Figure 3 represents a vertical section taken on the line 3—3 in Fig. 1 and looking in the direction of the arrows.
Figure 4 is a vertical section, on an enlarged scale, of the fluid pressure control means.
Figure 5 is a transverse section taken on the line 5—5 in Fig. 4.
Figure 9 is an elevation, partly in section, of the gear selecting and neutralizing switch mechanism, the same being shown in normal position by the full lines.
Figure 10 is a view similar to Fig. 9 but showing the switch mechanism in its partially actuated position to effect the return of any gear changing element to neutral position.
Figure 11 is a vertical section taken on the line 11—11 in Fig. 9 and looking in the direction of the arrows.
Figure 12 is a detail section taken on the line 12—12 in Fig. 9.
Figure 13 is a detail section, on an enlarged scale, taken vertically through the selecting switch.
Figure 14 is a section taken through the selecting switch on the line 14—14 in Fig. 13.

Referring first to Figs. 1 to 3 inclusive which show the improved gear changing device constructed and arranged to operate upon the usual hand shifting lever of an automobile transmission mechanism, 1 represents such hand shifting lever which is mounted to rock forwardly and rearwardly and laterally in the top of the transmission casing 2 as usual to effect the various gear changes, the lower end of this lever extending into the transmission casing and being engageable, by lateral rocking movement, with one or the other of the usual shiftable gear changing bars therein and operative by forward or rearward rocking movement to reciprocate the shifting bar engaged by it to effect the desired gear change. The transmission mechanism for example to which the hand shifting lever 1 is attached may be of the construction shown in Fig. 6 wherein 3 represents the main drive or clutch shaft driven as usual through the usual clutch from the automobile engine, 4 represents the main shaft which is connected at its rear end as usual to the rear or driving wheels of the automobile, 5 represents the usual countershaft of the transmission mechanism, it being driven from the clutch or drive shaft 3 by gears 6 as usual and having first, second and reverse gears 7, 8, and 9 thereon, the main shaft 4 having sliding gear 10 splined thereon and shiftable from its normal or neutral position into mesh either with the first speed or reverse gears connected to the countershaft, and the main shaft 4 also has a sliding clutch element 11 splined thereon and shiftable in one or the other direction from its normal neutral position to clutch or engage it with a second speed gear 12 fixed on the shaft 4 or with a third or high speed clutch member 13 fixed on the main drive or clutch shaft 3. The sliding gear 10 which sets the transmission mechanism for first or reverse gear is engaged by a shifting fork 14 fixed to a shifting bar 15 which is mounted to reciprocate in the transmission casing, and the second and third speed slidable clutch element 11 is engaged by a shifting fork 16 which is fixed to a shifting bar 17 which is mounted to reciprocate in the transmission casing. The transmission mechanism shown and described is of a well-known conventional form and it is set for the different gear changes by reciprocation of the shifting bars 15 and 17 in the usual and well-known manner, these shifting bars being engageable by the lower end of the hand shifting lever 1 in Fig. 1 to effect the operation thereof, as usual.

The gear changing device according to the embodiment of the present invention shown in Figs. 1 to 3 inclusive, is connected to the upper end of the usual hand shifting lever 1, for which purpose the upper end of this lever is provided with a vertical slot 20. The shifting device, according to this embodiment of the invention, comprises a cylinder 21 the ends of which are closed by heads 22 provided with bearing trunnions 23 arranged axially thereof at their outer sides, the cylinder containing a pair of reciprocatory pistons 24 which are connected to reciprocate in unison by a crosshead 25, this crosshead having an arm 26 which extends downwardly therefrom through a slot 27 in the lower side of the cylinder and is provided with a fork 28 to rotatably receive the upper slotted end of the shifting lever 1, this fork 28 being slotted vertically and receiving a pin 29 which extends therethrough and through the slot 20 in the upper end of the hand shifting lever. Compressed springs 30 are interposed between the heads 22 of the cylinder and the respective pistons 24, these springs being of equal power and being balanced when the pistons are in the mid position of their stroke, the hand shifting lever 1 being in its central or neutral position when the pistons occupy such position.

The cylinder 21 together with the pistons and crosshead contained therein is mounted to rock on its axis by a pair of brackets 31 which are fixed at their upper ends to the under side of the usual cowl 32 of the automobile, these brackets having bearings 33 at their inner sides in which the trunnions 23 on the ends of the cylinder are rotatable.

Rocking of the cylinder 21 and the pistons and crossheads therein serves to rock the hand lever 1 laterally to engage its lower end with one or the other of the shifting bars in the transmission mechanism. Different means may be provided for rocking the cylinder 21 for this purpose, it being preferable however to employ a solenoid 34 having an armature or core 35 operative therein and connected pivotally at 36 to the cylinder, the solenoid being pivotally supported at 37 on a bracket 38 which is fixed to the under side of the cowl 32. A spring 39 acts on the solenoid core 35 to hold the cylinder 21 in one of its rotative positions while the solenoid is de-energized, energizing of the solenoid causing the core 35 thereof to overcome the spring 39 and to rotate the cylinder 21 into its other rotative position. Preferably and as shown in Fig. 3, the solenoid and spring 39 are so arranged that while the solenoid is de-energized, said spring will hold the cylinder 21 in the full line position shown in Fig. 3, the hand shifting lever 1 being then connected at its lower end to the shifting bar in the transmission which sets the transmission mechanism for first speed and reverse, and when the solenoid is energized, the cylinder is rotated into the dotted line position shown in Fig. 3, it thereby swinging the hand shifting lever 1 laterally in a direction to engage its lower end with the shifting bar in the transmission mechanism which sets the latter for second and third or high speed, in accordance with the usual movements of the hand shifting lever of a conventional automobile transmission mechanism.

The pistons 24 in the cylinder 21 are operated in one or the other direction by fluid pressure admitted to one or the other end of the cylinder under control of a valve. This control valve is shown in detail in Fig. 4, it comprising a valve casing 40 having a port 41 which is connected by a pipe 42 to one end of the cylinder, and a port 43 which is connected by a pipe 44 to the opposite end of the cylinder. The valve also has a port 45 which is connected by a pipe 46 to a source of vacuum pressure, such as the usual intake manifold 47 of the automobile engine. The valve casing contains a valve chamber 48 with which the ports 41, 43, and 45 communicate, and this valve chamber contains a pair of piston valve members 49 and 50 which are connected by a valve stem 51 so that these valve members will reciprocate in unison in said valve chamber. Chambers 52 and 53 are provided at the ends of the valve chamber 48 and communicate therewith, and the chambers 52 and 53 are connected by a duct 54, the chamber 52 having a vent 55. The pipes 42 and 44 are flexible to permit rotation of the cylinder 21.

Different means may be provided for reciprocating the valve members 49 and 50 to control the ports 41 and 43, a pair of solenoids 60 and 61 being provided for this purpose in the present instance, these solenoids having a core or armature 62 actuated by one or the other of the solenoids when energized, a pair of springs 63 and 64 of equal power being provided above and below the core 62 and serving to hold the latter in an intermediate position when the solenoids are de-energized. The solenoid core 62 is connected to the valve stem 51 so that when said core is in its intermediate position, the valve members 49 and 50 will occupy the full line position shown in Fig. 4, they then closing both ports 41 and 43 to the port 45, both ends of the cylinder being then cut off from the vacuum pressure in the pipe 46. When one of the solenoids is energized, the valve members 49 and 50 will be lifted into the dotted line positions shown in Fig. 4, the port 41 being then uncovered by the valve member 49 and placed in communication with the port 45 so that a vacuum will be established in the right hand end of the cylinder 21 in Fig. 1, thereby acting to move the pistons 24 toward the right in that figure, and at the same time the port 43 will be uncovered by the valve member 50 and placed in communication with the vent 55 through the chamber 53 and duct 54, thereby permitting air at atmospheric pressure to flow into the other or left hand end of the cylinder in Fig. 1 to permit actuation of the pistons 24. When the other solenoid is energized, the valve members 49 and 50 will be moved downwardly, the valve member 50 uncovering the port 43 and thereby establishing communication between it and the port 45 so that a vacuum will be established in the opposite or left hand end of the cylinder in Fig. 1, and at the same time the valve member 49 will uncover the port 41 and establish communication between it and the vent 55, so that air at atmospheric pressure entering the port 55 may flow into the right hand end of the cylinder in Fig. 1 whereby movement of the pistons 24 to the left in that figure will take place. When either solenoid is de-energized, the valve members 49 and 50 will return to their normal position covering and closing the ports 41 and 43 and thereby maintaining the pistons 24 in the position into which they were shifted. Means is provided for equalizing the pressure in both ends of the cylinder to thereby permit the pistons 24 therein to return to their normal intermediate position under the balancing action of the springs 30 and thereby restore the hand shifting lever 1 to neutral position, such means comprising a release valve 65 which is connected by pipes 66 to the opposite ends of the cylinder, this release valve being normally closed but provided with means for opening it at the proper times, this valve being provided in the present instance with a solenoid 67 which acts, when energized, to open this valve. This release valve, as shown in detail in Fig. 15, comprises a casing having ports 65$^b$ and 65$^c$ connected to the respective ends of the cylinder by pipes 66, said ports communicating with a common vent port 65$^d$ under control of a piston valve 65$^e$ connected to the core or armature of the solenoid 67, the ports 65$^b$ and 65$^c$ being both normally closed as shown while the solenoid is de-energized and both of these ports being opened when the solenoid is energized, thereby admitting air at atmospheric pressure through the port 65$^d$ and port 65$^b$ or 65$^c$ to either end of the cylinder to equalize the pressure in both ends thereof.

Figures 6, 7, 8, 15, 18:
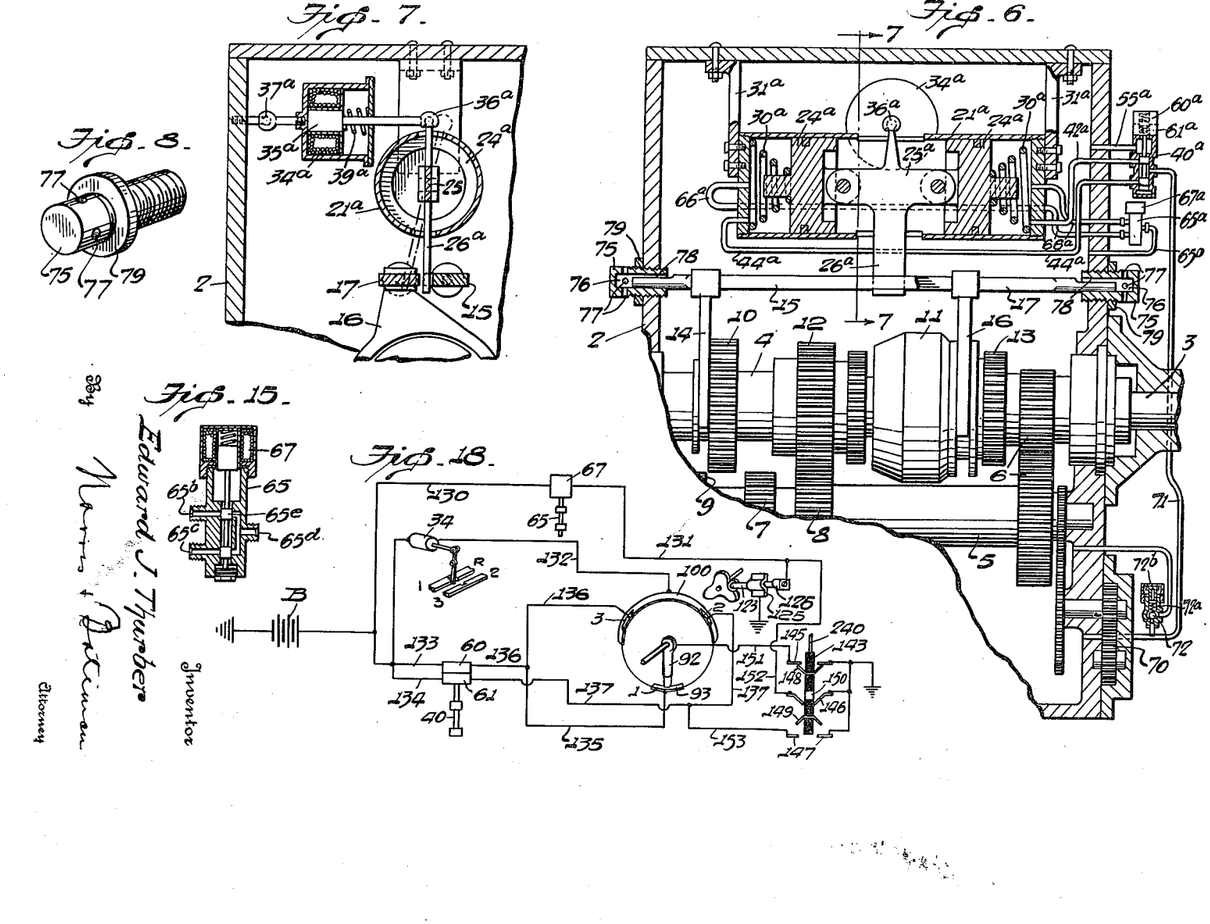
Figure 6 is a vertical section through a portion of an automobile transmission mechanism, showing a modified form of shifting device installed therein.
Figure 7 is a transverse vertical section taken on the line 7—7 in Fig. 6 and looking in the direction of the arrows.
Figure 8 is a detail perspective view of one of the metering plugs for the shifting bars of the transmission.
Figure 15 is a detail sectional view of the fluid pressure release valve.
Figure 18 is an electrical diagram showing the circuits connecting the electrical elements of the shifting device.

Figs. 6 and 7 show another form of fluid pressure operated gear selecting device similar in construction and mode of operation to that shown in Fig. 1 but installed within the casing of the transmission mechanism. In this form of the invention the cylinder 21$^a$ is rigidly supported in the top of the transmission casing by a pair of brackets 31$^a$ and the pistons 24$^a$ which are connected by the crosshead 25$^a$ are rotatable as well as reciprocatory in the ends of the cylinder, the arms 26$^a$ of the crosshead in this instance being engageable directly with one or the other of the shifting bars 15 and 17 by rocking movement of the pistons and crosshead, as indicated in Figure 7. The pistons and crosshead may be normally held in a position to actuate one of the shifting bars, as the bar 15, by a spring 39$^a$ acting on the stem of a solenoid core 35$^a$ having a ball and socket or other universal joint connection 36$^a$ with the upper end of the crosshead, and the piston and crosshead may be rocked into the dotted line position to connect the arm 26$^a$ operatively to the other shifting bar, as the bar 17, by energizing of a solenoid 34$^a$, the solenoid being supported by a ball and socket or other universal joint 37$^a$ on a side wall of the transmission casing. The pistons are returned to and normally held in their central or neutral position under the action of springs 30$^a$.

In the form of the invention shown in Figs. 6 and 7, the pistons 24$^a$ are actuated by oil pressure, the oil being forced from the lower portion of the transmission casing by a pump 70, which may be of the gear type driven from the transmission gearing, into a pipe 71 which leads into a control valve 40$^a$ which is similar in its construction and mode of operation to that shown in Fig. 4, except that it establishes communication with one or the other end of the cylinder, through the pipes 42$^a$ and 44$^a$, to admit oil under pressure thereto to actuate the pistons, and the vent port 55 of the valve leads by a pipe 55$^a$ back into the transmission casing for the return of oil thereto. The valve 40$^a$ is controlled by solenoids 60$^a$ and 61$^a$, and the release of oil from one or the other end of the cylinder to permit the pistons to return to their mid position and thus restore the shifting bar connected thereto to neutral position is effected by a release valve 65$^a$ like that shown in Fig. 15 but having its outlet connected by a pipe 65$^c$ to the interior of the transmission casing so that oil discharged through this valve will return to the transmission casing. The release valve 65$^a$ is controlled by a solenoid 67$^a$. An oil pressure relief valve 72, pressed toward its seat by a spring 72$^a$ and having its outlet 73 connected to the interior of the transmission case, may be used to control the pressure of oil developed by the pump in the pipe 71, the strength of the spring 72$^a$ being variable by an adjustable cap 72$^b$ threaded on the valve casing whereby the pressure of oil developed by the pump may be regulated. With this arrangement, when the valve members in the valve 40$^a$ are in their upper position, oil under pressure from the pipe 71 will be admitted to the right hand end of the cylinder through the pipe 42$^a$ and oil in front of the piston at the left hand end of the cylinder will be vented therefrom through the pipe 44$^a$ and pipe 55$^a$ and returned to the transmission case, and when the valve members in the valve 40$^a$ are in their lower position oil under pressure from the pipe 71 will be admitted to the left hand end of the cylinder through the pipe 44$^a$ and oil in front of the piston at the right hand end of the cylinder will be vented therefrom through the pipes 42$^a$ and 55$^a$ and returned to the transmission case, the valve 40$^a$ controlled by its solenoids 60$^a$ and 61$^a$ thus causing movement of the pistons in one or the other direction to correspondingly shift the shifting bars of the transmission mechanism to effect the desired gear changes, according to which of the shifting bars is engaged by the arm 26ª. Release of oil from either end of the cylinder to permit the pistons to return to central position, under the action of their springs and thus restore the shifting bar to which they are connected to neutral position, is effected by energizing the solenoid 67ª of the release valve 65ª, oil from one or the other end of the cylinder then flowing therefrom through the pipe 66ª, through the valve 65ª which is then opened, and through the pipe 65° back into the transmission case.

Fig. 6 shows means which is preferably employed to control the speed at which the shifting bars move under the action of the pistons to effect the different gear changes, and thus avoid clashing of the gears. Such means comprises a set of plugs 75 fitted into the opposite walls of the transmission case and in which the ends of the respective shifting bars reciprocate, these plugs each having a chamber 76 in which the respective end of the shifting bar operates, such chamber having discharge or vent openings 77 and the respective end of each shifting bar having a metering groove 78 formed therein. By this arrangement, the movement of the respective shifting bar into one or the other of the metering plugs compresses air in the chamber thereof, thus retarding the speed of movement of the shifting bar as determined by the size of the metering groove 78. These metering plugs are preferably threaded into the opposite walls of the transmission case to enable them to be adjusted toward and from the respective ends of the shifting bars and thus vary the size of the air chambers therein, lock nuts 79 serving to retain the metering plugs in properly adjusted positions.

Means is provided for automatically controlling the circuits of the solenoids 34 or 34ª, 60 and 61 or 60ª and 61ª and the solenoid 67 or 67ª. The controlling means shown in Figs. 9 to 14 inclusive comprises a square plunger 80 which is mounted to reciprocate in a rectangular guide 81, the plunger being normally held yieldingly in its elevated upright position by a spring 82 and the extent of movement of the plunger being limited by a vertical slot 83 therein through which extends a pin 84 secured in the upper portion of the guide 81 and on which the plunger may rock laterally as a center. The guide 81 is mounted to slide in a slot 85 formed in a supporting bracket 86 into either of the two positions shown by the full and dotted lines in Fig. 9, the bracket 86 being fixed in a convenient position for operation upon any suitable part of the automobile, as for example beneath the foot board 87 thereof as shown in Fig. 1, and the upper end of the plunger may be operated by the driver in any suitable manner, it being preferably located below the rear or heel portion of the usual accelerator pedal 88 so that reverse rocking of the accelerator pedal will depress and actuate the plunger.

A cam 90 of triangular form is mounted below the plunger on a shaft 91 which is located midway between the two operative positions into which the plunger may be shifted as indicated by the full and dotted lines in Fig. 9, this cam having notches 90ª therein adjacent to its apices in which the lower end of the plunger may engage, so that depression of the plunger will rotate this cam and its shaft in one or the other direction according to the position occupied by the plunger. The plunger may yield or deflect laterally about the pin 84 as a center to permit the apex of the cam to assume a position beneath the plunger as the cam completes each third of a revolution in either direction. The shaft 91 carries an electrical contact brush 92 which is arranged to engage contact plates 93, 94, and 95 successively during each one-third revolution of the shaft 91 effected by successive actuations of the plunger 80. The contact plates 93, 94, 95, which are set in an insulating casing 96, have terminals 97, 98 and 99 which are appropriately connected to the solenoids 60 and 61 or 60ª and 61ª to properly control the valve 40 or valve 40ª to effect movements of the pistons in the appropriate directions to shift the shifting bars of the transmission mechanism for first, second and third speed. The insulating casing 96 of this distributing switch also contains a contact strip 100 which extends from a point somewhat in advance of the second speed contact plate 94 to and somewhat beyond the third speed contact plate 95, this contact strip being engageable by the rotating brush 92 and being connected by its terminal 101 to the solenoid 34 or 34ª which rocks the piston crosshead to connect it to the appropriate shifting bar of the transmission mechanism. The plunger 80 and its guide 81 may be shifted from the full line position shown in Fig. 9 to the dotted line position shown in that figure, to effect rotation of the shaft 91 and the contact brush 92 in a reverse direction, by a flexible cable 102 of well known construction comprising an outer flexible jacket and an inner stiff wire, the latter being connected to one arm of a bell crank lever 103 pivoted at 104 on the lower end of the casing of the steering column 105, as shown in Fig. 1, the other arm of this bell crank lever being connected by a cable 106 which extends upwardly within the steering column and is attached at 107 to a knob 108 which normally occupies the lowered position shown in Fig. 1 but which may be pulled upwardly and thereby shift the plunger 80 into the dotted line position shown in Fig. 9.

Means is provided for visually indicating to the driver the speed for which the shifting mechanism is set at any time, such means comprising a flexible shaft 110 which is connected to the shaft 91 and by bevel gearing 111 at the lower end of the steering column to a sleeve 112 which is rotatably mounted therein, the upper end of this sleeve having a sleeve 113 fixed thereon and fitting into the hub of the knob 108 so that the latter will rotate in accordance with the rotation of the shaft 91, and a relatively stationary non-rotatable member 114 which may be fixed on the upper end of a stationary or non-rotatable sleeve 115 mounted within the steering column may be provided with suitable indicia 116 with which a pointer 117 on the knob 108 may cooperate as this knob is rotated into different positions incident to the rotation of the shaft 91 to set the shifting mechanism for different gear changes, said indicia and pointer indicating to the driver the speed for which the shifting mechanism is set. The knob 108 is shiftable axially on the sleeve 113 to enable it to actuate the cable 102, and an annular spring or other yieldable detent 118 is provided on the sleeve 113 to cooperate with one or another of the grooves or notches 119 in the knob 108 to yieldingly retain it in its lowered or raised position.

Means is provided for energizing the solenoid 67 or 67ª of the release valve 65 or 65ª while a change from one gear or speed to another is made, thus permitting the pistons to return to their central position and the shifting bar connected thereto to return to neutral position. Such means as shown in Figs. 9 and 10 comprises a cam 120 which is fixed on the shaft 91 to rotate therewith, this cam having three lobes 121 arranged to cooperate with a roller 122 mounted on a plunger 123, the roller being pressed toward and held in engagement with said cam by a compressed spring 124, the plunger being mounted to reciprocate in a guide 125, the rear end of this plunger being arranged to contact with a switch member 126 when the plunger is forced toward it by the riding of the roller 120 on a cam lobe 121, as shown in Fig. 10, the switch member 126 being connected in circuit with the solenoid 67 or 67ª so that such solenoid will be energized when the switch member 126 is engaged by the plunger 123. Normally, the roller 122 will rest in a recess between adjacent lobes 121, the plunger 123 being then disengaged from the switch member 126. The roller 122 reaches the highest point on a lobe 121 when the plunger 80 reaches the position shown in Fig. 10, and as the cam 120 rotates slightly further, the roller 122 will ride down the other side of this lobe until it reaches the recess between it and the next lobe, as shown in Fig. 9, thus completing a one-third revolution of the shaft 91 at each actuation of the plunger 80 and placing the cam 90 in position for its next actuation by the plunger 80.

The transmission mechanism is set for reverse gear by a switch which is shown in detail in Figs. 16 and 17 controlled preferably by a plunger 139. The plunger is mounted to reciprocate in the member 114 at the top of the steering column as shown in Fig. 1, the plunger being yieldingly held in raised or lowered position by a circular coiled spring 140 in the member 114 which is engageable in one or another of a pair of circumferential grooves 141 and 142 in said plunger. The plunger 139 is connected to the movable member 143 of the switch shown in Figs. 16 and 17 by a flexible cable 240 of well known construction comprising a stiff wire movable endwise in an outer spiral wire jacket, said switch comprising a casing 144 of suitable insulating material having pairs of upper, intermediate and lower pairs of contact plates 145, 146, and 147 mounted in fixed positions therein, one each of the upper and lower pairs of contact plates being preferably bent upwardly and downwardly respectively, as shown at 145ª and 147ª to provide brackets by which the switch may be attached to a suitable part of the automobile, as at the lower end of the housing of the steering column 105, as shown. The reciprocatory switch member 143 carries an upper contact member 148 adapted to bridge the pair of contact plates 145, when said switch member is in raised position, and a lower contact member 149 adapted to bridge the pair of contact plates 147 when said switch member is in lowered position. The reciprocatory switch member 143 is of suitable insulating material except for a metallic or conducting sleeve 150 on its intermediate portion which is adapted to bridge the contact plates 146 when the switch member is midway of its upper and lower positions.

Fig. 18 shows diagrammatically the connections between the electrical elements of the shifting mechanism. The power for the operation of these electrical elements may be obtained from the conventional storage battery B as commonly used on automobiles, one terminal of this battery being grounded to the frame of the automobile, as usual. The other terminal of the battery is connected by a conductor 130 to the solenoid 67 or 67ª of the release valve 65 or 65ª and by a conductor 131 to the switch contact 126, the guide 125 for the plunger 123 being grounded. Another conductor 132 leading from the battery connects the solenoid 34 or 34ª therewith and with the contact strip 100 of the rotary distributing switch. Conductors 133 and 134 connect the solenoids 60 and 61 or 60ª and 61ª to the battery, the solenoid 60 or 60ª being connected by the conductors 135 and 136 to the contact plates 93 and 95 respectively of the distributing switch, and a conductor 137 connects the solenoid 61 or 61ª to the contact plate 94 of the rotary distributing switch, the shaft of this distributing switch being grounded on the frame of the automobile.

The upper contact plates 145 of the reversing switch are connected in the circuit which controls the forward speeds, they being connected for example in series in the conductor 151 which connects the rotary contact brush 92 of the distributor switch to ground, and while the plunger 139 and switch member 143 are in normally raised position as shown, the contact member 148 of the reversing switch will complete the circuit through the conductor 151 so that the distributing switch may set the shifting mechanism for any of the forward speeds. The contact plates 146 of the reversing switch are connected in circuit with the solenoid 67 or 67ª of the release valve, as by a conductor 152, so that when the switch member 143 is moved into its lower position, the conducting sleeve 150 will, during such movement, after the circuit between the upper contact plates 145 is broken, bridge the plates 146 and thereby cause the solenoid of the release valve to be energized whereby any gear changing element in operative position will be restored to neutral before a gear change is made. The lower contact plates 147 of the reversing switch are connected in circuit with the appropriate solenoid of the valve 40 or 40ª to cause movement of the pistons in the proper directions to move the appropriate shifting bar in the transmission mechanism to set the same in reverse gear, these contact plates being shown connected for example in series by a conductor 153 to the solenoid 61 for the valve 40, so that when the switch member 143 reaches its lowered position and the contact member 149 thereon bridges the contact plates 147, the valve 40 will be operated to cause actuation of the shifting mechanism to set the transmission mechanism in reverse, the circuit through the conductor 151 for the selecting of the different forward speeds being then broken by disengagement of the contact member 148 from the contact plates 145.

In using the valves 40 and 40ª for vacuum and oil pressure control respectively, the directions of movement of the pistons 24 and 24ª will, of course, be relatively reversed with respect to the positions occupied by said valves under control of their solenoids, but this may be provided for by winding the solenoids in the appropriate directions to effect movements of said valves in the proper directions to effect movements of the pistons in the appropriate directions.

The operation is as follows:—In order to set the transmission mechanism in first speed forward, the rear end of the accelerator pedal 88 is depressed and the plunger 80, occupying its normal full line position, Fig. 9, is actuated thereby until the pointer 117 on the knob 108 is opposite to "1" at the top of the steering column, the rotating contact brush 92 then engaging the first speed contact plate in the distributor switch, as the plate 93. An electrical circuit will then be established through the appropriate solenoid to operate the valve 40 or 40ª in the proper direction to effect shifting of the pistons 24 or 24ª in the appropriate direction to move the shifting bar 15 in the transmission mechanism in a direction to engage it for first speed. Second speed is obtained by again depressing the plunger 80 by the rear end of the accelerator 88 whereby the shaft 91 is rotated one-third of a revolution, a lobe 121 on the cam 120 first acting to move the plunger 123 into engagement with the switch contact 126 connected to the solenoid 67 or 67ª of the release valve 65 or 65ª to energize said solenoid and open the release valve, thereby permitting the pistons 24, 24ª to return to their central position and causing the shifting bar connected thereto to restore the first speed gear to neutral position, and as the shaft 91 completes this third of a revolution, the contact brush 92 thereon first engages the contact strip 100 connected to the solenoid 34 or 34ª, thereby energizing it and causing the crosshead 26 or 26ª to rock in a direction to establish an operating connection between the pistons and the shifting bar 17 of the transmission mechanism, after which the contact brush 92 engages the contact plate 94 which is connected to the solenoid of the valve 40 or 40ª which, when energized, will set said valve to cause movement of the pistons in a direction to move the shifting bar 17 in a direction to set the transmission mechanism in second speed forward. A third actuation or depression of the plunger 80 will impart another one-third revolution to the shaft 90 during which the plunger 123 again engages the switch contact 126 to close the circuit through the solenoid of the release valve to permit the pistons to return to central position and the shifting bar 17 to return to neutral position, and the final portion of this one-third revolution of the shaft 91 brings the contact brush 92 thereon into engagement with the contact plate 95 which is connected to the appropriate solenoid of the valve 40 or 40ª to actuate this valve to cause movement of the pistons 24 or 24ª in the proper direction to shift the shifting bar 17 in the direction to set the transmission mechanism for third speed forward.

When it is desired to shift the gear changing elements or change the speeds of the transmission mechanism retrogressively from third speed down to second or first speed, the plunger 80 is shifted from the full line to the dotted line position shown in Fig. 9 by pulling upward of the knob 108, the plunger 80 being then set to act on the cam 90 to rotate it and the shaft 91 in a reverse direction, so that the contact arm 92 will successively move from the contact plate 95 to the plate 94 and from the plate 94 to the contact plate 93, the plunger 123 engaging the switch member 196 during each actuation of the plunger 80 and thereby restoring each sliding gear changing element previously engaged to neutral before the next gear change is made.

The transmission is set in reverse gear by depressing the plunger 139, this plunger being connected to the reversing switch member 143 by the cable 240 and therefore moving this switch member from its normally raised position shown to its lowered position, causing the release valve 65 or 65ª to restore any gear changing element in operative position to neutral and then causing the valve 40 or 40ª to operate to effect movement of the pistons 24 or 24ª in the appropriate direction to shift the shifting bar 15 in the direction to engage the reverse gears. Since the hand lever 1 or the crosshead 26ª is normally connected to the first and reverse shifting bar 15, it is unnecessary to energize the solenoid 34, 34ª in order to set the shifting mechanism for reverse gear.

When the shifting device is installed on an automobile equipped with a so-called free-wheeling device or overrunning clutch which allows the engine to idle while the automobile drifts freely in disconnected relation to the engine, the different gear changes may be made as above described as soon as the contact brush 92 comes into engagement with the contacts 93, 94 and 95 of the distributing switch, the circuits for the respective solenoids being thereby closed and completed.

However, whenever desired, a separate switch may be employed to complete the circuits of the solenoids which control the different gear changes whenever desired by the driver, so that the driver may select a gear change desired in advance and may operate the separate switch to actually make the gear change at any desired time.

The present invention, as will be apparent from the foregoing, provides a gear changing device which may either be applied to the usual hand shifting lever commonly used on automobiles, thus enabling the device to be installed readily on existing automobiles, or to be mounted within the transmission case, no alteration of the gear mechanism of the transmission being necessary in either case.

Furthermore, the invention provides a shifting device which is operative by fluid pressure, utilizing either vacuum pressure such as that conveniently available from the intake manifold of the automobile engine or pressure developed by a pump or other source of pressure.

The indicator cooperative with the knob at the top of the steering column always indicates the speed for which the device is set, and it also provides means operable manually from a point located conveniently to the operator for setting the selecting device to operate either to change the speeds progressively from first up to third speed forward or to change the speeds retrogressively from third speed down to second or first speed.

I claim as my invention:—

1. A gear changing device for an automobile transmission mechanism, comprising a reciprocatory actuating member having means for operatively connecting it to a gear changing element of the transmission mechanism, power means for reciprocating said member, controlling means movable in different directions and connected to said power means to control the supply of motive power to the actuating member to reciprocate it in one or another direction to operate the gear changing element to effect progressive or retrogressive gear changes, and a reciprocatory member operative successively and capable of being set at will in different positions relatively to said controlling means to move said controlling means in one or another direction to cause operation of the actuating member to effect gear changes either progressively or retrogressively.

2. A gear changing device for an automobile transmission mechanism, comprising an actuating member movable in different directions and having means for operatively connecting it to a gear changing element of the transmission mechanism for shifting it to effect different gear changes, power means for reciprocating said member, a controlling member movable in either of two directions, means governed by the direction of movement of said controlling member and having means connecting it to said power means to control the supply of motive power to the actuating member to reciprocate it in one or another direction to effect different gear changes and determine the order of gear changes to be made by said actuating member, and a reciprocatory operating member engageable with the controlling member to actuate it and shiftable relatively to said controlling member to effect movement thereof in one or the other of said directions.

3. A gear changing device for an automobile transmission mechanism having a shiftable gear changing element, comprising an actuating member movable in opposite directions and having means for operatively connecting it to the gear changing element of the transmission mechanism to effect different gear changes, power means for reciprocating said member, controlling means for said actuating member connected to said power means to control the supply of motive power to said member to reciprocate it to effect different gear changes and including a rotatable controlling member and means governed thereby to determine the directions of movement of the actuating member according to a predetermined order of gear changes, and a reciprocatory member operative successively and engageable with said controlling member to rotate it step by step to effect such predetermined order of gear changes.

4. A gear changing device for an automobile transmission mechanism having a plurality of shiftable gear changing elements, comprising a reciprocatory actuating member having electromagnetically controlled means for operatively connecting it to one or another of said elements and electromagnetically controlled means for controlling its direction of movement to shift such gear changing elements in either of two directions to effect different gear changes, and switch means for controlling said actuating member having a contact connected to the electromagnetic controlling means for said connecting means to control said connecting means to determine the gear changing element to which the actuating member will be connected and having other contacts and means for connecting them to the electro-magnetic controlling means for said direction controlling means for controlling the direction of movement of said actuating member.

5. A gear changing device for an automobile transmission mechanism having a pair of reciprocatory gear changing elements, comprising a reciprocatory actuating member, electro-magnetic means for operatively connecting said member to one or the other of said elements, electro-magnetic means controlling the direction of movement of the reciprocatory actuating member, a switch including a governing contact controlling the electro-magnetic means for operatively connecting the actuating member to one or the other of said elements and a series of contacts connected to the electro-magnetic means for controlling the direction of movement of the actuating member, and a controlling contact member common to said governing contact and series of contacts and movable successively into engagement with said series of contacts and also into engagement with said governing contact prior to its engagement with certain of said series of contacts.

6. A gear changing device for an automobile transmission mechanism having a pair of reciprocatory gear changing elements, comprising a reciprocatory actuating member, electro-magnetic means for operatively connecting said member to one or the other of said elements, electro-magnetic means controlling the direction of movement of the reciprocatory actuating member, and a switch having a contact controlling the electro-magnetic means for operatively connecting the actuating member to one or the other of said elements, a plurality of other contacts connected to the electro-magnetic means controlling the direction of movement of the actuating member, and a controlling contact member common to and cooperative with all of said contacts.

7. A gear changing device for an automobile transmission mechanism having a pair of reciprocatory gear changing elements, comprising a reciprocatory actuating member, electro-magnetic means for operatively connecting said member to one or the other of said elements, electro-magnetic means controlling the direction of movement of the reciprocatory actuating member, and a switch having a series of contacts connected to the electro-magnetic means controlling the direction of movement of the actuating member, a contact cooperative with certain of the contacts of said series, and a single controlling contact member engageable by movement thereof in one direction in predetermined order with said series of contacts and with said cooperative contact prior to its engagement with certain of said series of contacts.

8. A gear changing device for an automobile transmission mechanism having a pair of reciprocatory gear changing elements, comprising a reciprocatory actuating member, electro-magnetic means for operatively connecting said member to one or the other of said elements, electro-magnetic means controlling the direction of movement of the reciprocatory actuating member, and a switch having a series of contacts connected to the electro-magnetic means controlling the direction of movement of the actuating member, a contact cooperative with certain of the contacts of said series, a controlling contact member engageable with said series of contacts and said cooperative contact, and means for moving said contact member in a direction to engage the contacts of said series successively in predetermined order.

9. A gear changing device for an automobile transmission mechanism having a pair of reciprocatory gear changing elements, comprising a single reciprocatory fluid pressure operated actuating member for both gear changing elements, electro-magnetically controlled valve means controlling the direction of movement of said member, electro-magnetically controlled means for operatively connecting the actuating member to one or the other of the gear changing elements, and an electric switch having contacts connected to the electro-magnetic controlling means for said valve means and the electro-magnetic controlling means for said connecting means, and a controlling member common to said contacts and operable at will to control the direction of movement of the actuating member and its connection to one or the other of the gear changing elements.

10. A gear changing device for an automobile transmission mechanism, comprising an actuating member having means for operatively connecting it to a gear changing element of the transmission mechanism, means including a rotatable controlling member for setting said actuating member to effect different gear changes, means for operating said controlling member to effect gear changes in one or another predetermined order, an indicating member having means for rotatably mounting it on the steering column of an automobile, means connecting said indicating and controlling members for coordinated movement, said indicating member being shiftable into different positions, and means connecting said indicating member to said operating means and operative by the shifting of said indicating member to determine the order of gear changes as controlled by said controlling member.

11. A gear changing device for an automobile transmission mechanism, comprising an actuating member having means for operatively connecting it to a gear changing element of the transmission mechanism, a rotatable controlling member for setting said actuating member to effect different gear changes, an operating member shiftable into one or another position to rotate said controlling member in one or the other direction, an indicating member having means for mounting it shiftably and rotatably on the steering column of an automobile, means connecting said indicating and controlling members for coordinated rotation, and means connecting said indicating member and operating member for shifting the latter by shifting the indicating member.

12. A gear changing device for an automobile transmission mechanism having a lever for shifting the gear changing elements thereof, comprising a cylinder mounted to rotate on its longitudinal axis, a pair of pistons mounted to reciprocate in said cylinder and to rotate therewith and having means operatively connecting it to said lever, means for causing fluid pressure to act on said pistons to move said lever in one direction, and means for rotating said cylinder and pistons to move said lever in a relatively transverse direction.

13. A gear changing device for an automobile transmission having a reciprocatory gear changing member, comprising fluid pressure operated means for reciprocating said member, and a metering plug for each end of said member and having a chamber in which the respective end of said member is movable, each end of said member having a fluid-escape groove extending into the respective metering chamber and controlling the speed of movement of said member.

14. A gear changing device for an automobile transmission mechanism, comprising an actuating member having means for operatively connecting it to a gear changing element of the transmission mechanism, controlling means for said actuating member including a controlling member operative to set the device to effect gear changes for different speeds, electro-magnetically controlled means cooperative with said actuating member for setting the device in neutral condition, and means including a switch connected to said controlling member to operate in coordinated relation therewith, and having contact means connected to the electro-magnetic controlling means for said setting means for automatically setting the device in neutral condition before making each gear change.

15. A gear changing device for an automobile transmission mechanism, comprising an actuating mechanism having electro-magnetically controlled means for operatively connecting it to the gear changing elements of the transmission mechanism and electro-magnetically controlled means for moving it in different directions to set the transmission mechanism for different speeds, and controlling means for said actuating mechanism embodying a switch having contacts connected respectively to the electro-magnetic controlling means for said connecting means and for said moving means for the actuating mechanism and a member controlling said switch contacts, and means operative by successive actuations thereof to operate said member to set the actuating mechanism to effect different speed changes progressively, and means connected to said member and operative at will to set the actuating mechanism selectively for different gear changes.

16. In a gear changing device for an automobile transmission mechanism having a pair of reciprocatory gear changing elements, power means for actuating said elements comprising a fluid pressure cylinder mounted to rotate on its longitudinal axis, a fluid pressure operative piston member reciprocable in said cylinder and rotatable therewith, and an actuating member connected to said piston member and rotatable therewith into operating relation with one or the other of said gear changing elements and reciprocable with said piston member to actuate the gear changing element in operating relation with it.

17. In a gear changing device for an automobile transmission mechanism having a plurality of reciprocatory gear changing elements, power means for actuating said elements comprising a fluid pressure cylinder, a pair of axially spaced connected pistons mounted to reciprocate in unison in said cylinder and to rotate about the axis thereof, an actuating member located between and connected to said pistons to reciprocate and rotate therewith and extending through a side of the cylinder for operative connection to one or another of said gear changing elements, and means for admitting fluid pressure to one or the other end of the cylinder to cause reciprocation of said actuating member and of the gear changing element to which it is connected.

18. In a gear changing device for an automobile transmission mechanism having a plurality of reciprocatory gear changing elements, power means for actuating said elements comprising a fluid pressure cylinder having means for supporting it for rotation on its axis, a pair of axially spaced connected pistons mounted to reciprocate in unison in said cylinder, an actuating member connected to said pistons to reciprocate therewith and extending through a side of the cylinder between said pistons and rotatable with said cylinder for operative connection to one or another of said gear changing elements, and means for admitting fluid pressure to said cylinder to act on said pistons to cause reciprocation thereof in one or the other direction.

EDWARD JOHN THURBER,